United States Patent
Inamdar et al.

(10) Patent No.: US 12,463,935 B2
(45) Date of Patent: Nov. 4, 2025

(54) CONTROLLER-BASED DISTRIBUTED REMOTE ACCESS WITH STATIC PUBLIC IP AVOIDANCE

(71) Applicant: Cisco Technology, Inc., San Jose, CA (US)

(72) Inventors: Amjad Inamdar, Bengaluru (IN); Syed Arslan Ahmed, Karnataka (IN); Anoop V A, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/153,930

(22) Filed: Jan. 12, 2023

(65) Prior Publication Data

US 2024/0244029 A1  Jul. 18, 2024

(51) Int. Cl.
*H04L 61/2567* (2022.01)
*H04L 9/40* (2022.01)
*H04L 61/256* (2022.01)

(52) U.S. Cl.
CPC ...... *H04L 61/2567* (2013.01); *H04L 61/2564* (2013.01); *H04L 63/061* (2013.01); *H04L 63/0876* (2013.01)

(58) Field of Classification Search
CPC ..... H04L 67/02; H04L 67/56; H04L 63/0272; H04L 67/1021; H04L 67/01; H04L 67/563; H04L 67/568; H04L 63/029; H04L 12/2856; H04L 12/4633; H04L 2101/69; H04L 47/283; H04L 61/2514; H04L 61/2575; H04L 61/2589; H04L 61/4511; H04L 61/5007; H04L 69/167; H04L 69/168; H04L 12/2803; H04L 61/2553; H04L 61/256; H04L 61/2585;
(Continued)

(56) References Cited

U.S. PATENT DOCUMENTS

2006/0143702 A1  6/2006  Hisada et al.
2007/0157303 A1* 7/2007  Pankratov ............... H04L 67/14
                                                              726/11
(Continued)

OTHER PUBLICATIONS

Cisco "Cisco Secure Client Ordering Guide" C07-732790-19, Jul. 2022, 18 pages.
(Continued)

*Primary Examiner* — Djenane M Bayard
(74) *Attorney, Agent, or Firm* — Lee & Hayes, P.C.

(57) ABSTRACT

A method of implementing controller-based distributed remote access may include connecting a plurality of edge devices to a controller via a network. The plurality of edge devices may perform hole punching to traverse a network address translation (NAT) gateway to create a NAT hole. The method may also include connecting a client device to the controller. The client device may be directly connected to one of the plurality of edge devices via the NAT hole in the network. The method may further include directly connecting the client device to one of the plurality of edge devices by receiving a query from the client device and returning public IP/ports of a most relevant edge device to the client device, the most relevant edge device being based on attributes of the client device, attributes of the plurality of edge devices, or combinations thereof.

20 Claims, 7 Drawing Sheets

(58) Field of Classification Search
CPC ............. H04L 61/2592; H04L 63/0281; H04L 63/164; H04L 67/025; H04L 67/1008; H04L 67/133; H04L 67/141; H04L 67/142; H04L 67/288; H04L 67/2885; H04L 67/567; H04L 67/5681; H04L 67/63; H04L 69/16; H04L 69/162; H04L 69/325; H04L 69/326; H04L 69/329; H04L 1/00; H04L 61/59; H04L 63/145; H04L 63/1466; H04L 63/1483; H04L 63/168; H04L 67/146; H04L 69/40; H04L 67/06; H04L 61/5014; H04L 67/14; H04L 63/0227; H04L 63/0876; H04L 67/59; H04L 67/104; H04L 65/1069; H04L 65/1073; H04L 65/1083; H04L 65/1089; H04L 65/1104; H04L 65/403; H04L 65/4061; H04L 61/2567; H04L 67/55; H04L 51/234; H04L 61/2517; H04L 61/2521; H04L 61/503; H04L 51/04; H04L 63/0428; H04L 65/1094; H04L 67/51; H04L 61/2564; H04L 41/00; H04L 51/58; H04L 61/2571; H04L 61/2578; H04L 61/45; H04L 61/4535; H04L 61/4557; H04L 63/068; H04L 63/08; H04L 63/104; H04L 65/752; H04L 9/32; H04L 2463/121; H04L 41/0654; H04L 41/0663; H04L 43/16; H04L 45/22

See application file for complete search history.

(56) References Cited

U.S. PATENT DOCUMENTS

| 2011/0013637 | A1 | 1/2011 | Xue et al. | |
|---|---|---|---|---|
| 2011/0225424 | A1* | 9/2011 | Zee | H04L 63/061 |
| | | | | 713/171 |
| 2011/0252238 | A1* | 10/2011 | Abuan | H04L 63/068 |
| | | | | 713/168 |
| 2012/0254944 | A1 | 10/2012 | Kamat et al. | |
| 2016/0087933 | A1* | 3/2016 | Johnson | H04L 41/08 |
| | | | | 709/245 |
| 2016/0174178 | A1* | 6/2016 | Nistor | H04L 63/00 |
| | | | | 370/503 |
| 2019/0342266 | A1 | 11/2019 | Ramachandran et al. | |
| 2020/0344084 | A1* | 10/2020 | Shribman | H04W 48/18 |
| 2021/0135901 | A1* | 5/2021 | Xie | H04L 12/4625 |
| 2023/0038620 | A1* | 2/2023 | Kim | H04L 61/256 |
| 2023/0216947 | A1* | 7/2023 | Bernardi | H04L 63/10 |
| | | | | 713/150 |
| 2023/0367833 | A1* | 11/2023 | Kol | H04L 67/56 |

OTHER PUBLICATIONS

Anonymous: "MEF Standard,—MEF 70-SD-WAN Service Attributes and Services", Jul. 1, 2019 (Jul. 1, 2019), pp. 1-57, XP093144172,Retrieved from the Internet:URL:https://www.mef.net/wp-content/uploads/2019/07/MEF-70.pdf [retrieved on Mar. 21, 2024]cited in the applicationthe whole document, 58 pages.

Anonymous: "UDP hole punching—Wikipedia", Jun. 17, 2015, XP055344305.

Cisco: "Cisco SD-WAN Design Guide",Sep. 1, 2020 (Sep. 1, 2020),XP093028951,Retrieved from the Internet: URL:https://web.archive.org/web/20210806133945if_/https://www.cisco.com/c/en/us/td/docs/solutions/CVD/SDWAN/cisco-sdwan-design-guide.pdf[retrieved on Mar. 3, 2023]the whole document, 102 pages.

The PCT Search Report and Written Opinion mailed Apr. 3, 2024 for PCT Application No. PCT/US2023/084574 frp, PCT Summary, 30 pages.

Seemann Marten et al: "Decentralized Hole.Punching",2022 IEEE 42nd International Conference on Distributed Comput.ing Systems Workshops( ICDCSW) , IEEE,Jul. 10, 2022 (Jul. 10, 2022), pp. 96-98, XP034234897, DOI: 10.1109/ICDCSW56584.202?.00027[retrieved on Nov. 28, 2022]p. 1-p. 3, 4 pages.

\* cited by examiner

CONTROLLER-BASED DISTRIBUTED REMOTE ACCESS WITH STATIC PUBLIC IP AVOIDANCE

TECHNICAL FIELD

The present disclosure relates generally to secure computer networking. Specifically, the present disclosure relates to systems and methods for implementing controller-based distributed remote access with static public Internet protocol (IP) avoidance.

BACKGROUND

Remote access (RA) services provided through a virtual private network (VPN) may be used to enable digital enterprises to provide secure access to corporate resources. In this manner the corporate resources may be provided via the RA VPN to a remote workforce such as teleworkers, sales teams, and similar remotely-working individuals. The RA traffic may be a relatively smaller percentage of the total enterprise traffic and has been catered to by few centrally located RA headends deployed in locations such as a data center. However, recently remote working has become a norm with the hybrid work model being adopted by digital enterprises. Thus, RA services have become as significant as a site-to-site network services. To meet the increased scale requirements, RA services should be decentralized and RA headends need to be deployed closer to the RA service users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
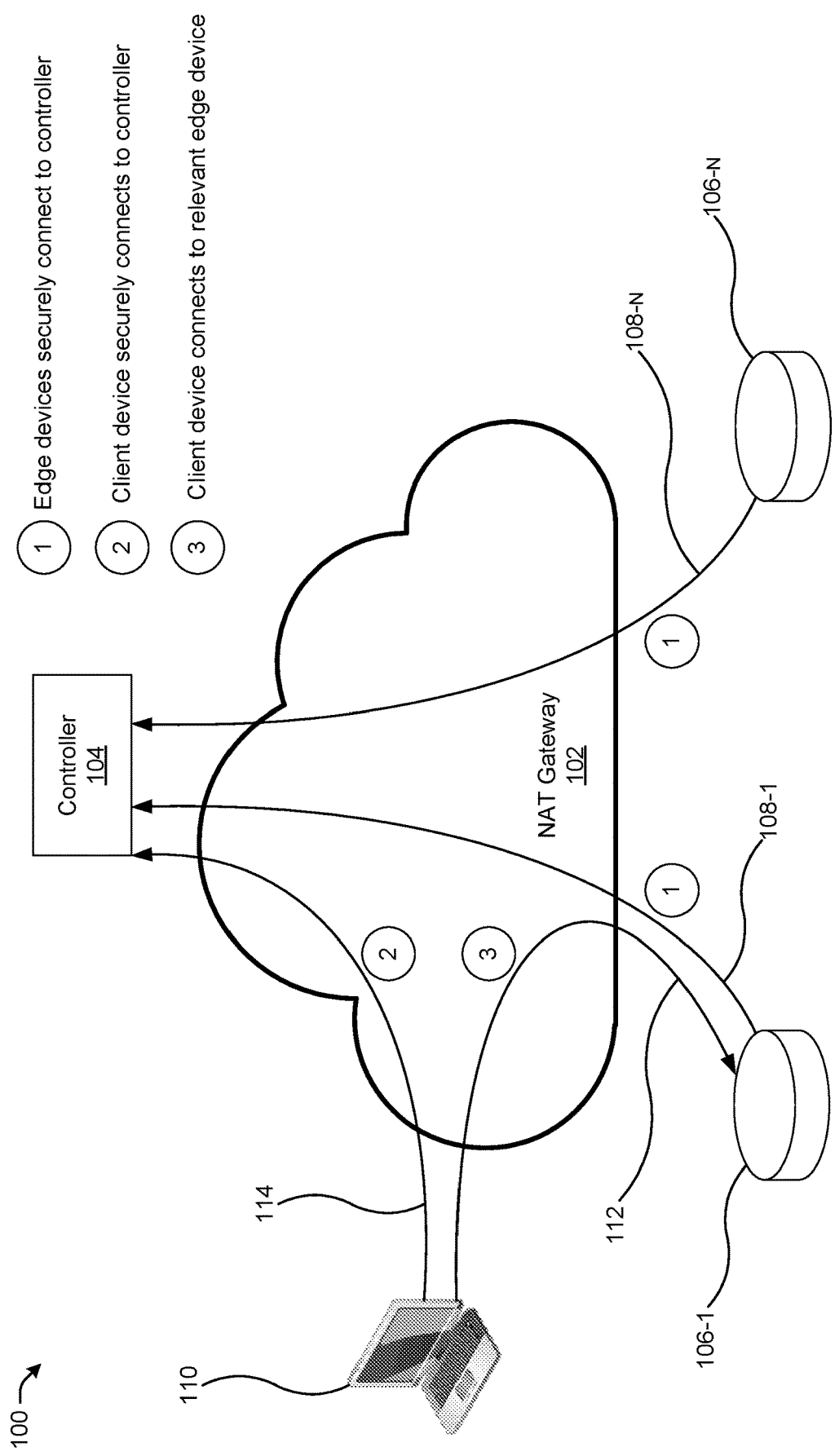
FIG. 1 illustrates a system-architecture diagram of a wide area network, according to an example of the principles described herein.

One of the challenges with RA networking and services may include the RA headends being unreachable and cannot reach the RA headends at a dynamic private wide area network (WAN) internet protocol (IP) address from the RA clients. Further, the RA headends may be located anywhere on the earth and may influence the reachability of the RA clients to the RA headend. Static public IP is not only more expensive and requires coordination with internet service providers (ISPs) but also exposes the RA headend sites and the corporate network to distributed denial-of-service (DDOS) attacks. Organizations may incur significant operational costs on DDOS protection services offered by third-party vendors in addition to the cost of static public IP provided by the ISP.

In addition, the list of RA headends may be statically provisioned on RA clients and the selection is not based on current load conditions. This may result in poor quality of experience or quality of service (QOS) for the RA clients. For truly distributed, large scale remote access solutions, the issues surrounding the static public WAN IPs and the dynamic optimal selection of the RA headend needs to be solved.

Overview

In the examples described herein, a controller-based architecture may be leveraged to eliminate the need for static public IPs on remote access (RA) headends. The present systems and methods also enable dynamic and optimal distribution of RA clients across RA headends using geolocation, identity and load based policies. Further, the present systems and methods may utilize any type of centralized anchor in the network that provides the controller functions described herein.

Examples described herein provide a method of implementing controller-based distributed remote access that may include connecting a plurality of edge devices to a controller via a network. The plurality of edge devices may perform hole punching to traverse a network address translation (NAT) gateway to create a NAT hole. The method may also include connecting a client device to the controller. The client device may be directly connected to one of the plurality of edge devices via the NAT hole in the network.

The hole punching may include registering the plurality of edges devices by transmitting at least one data packet from one of the plurality of edge devices to the controller via the NAT gateway. Registering the plurality of edge devices may include registering at least one post-NAT public internet protocol (IP) port with the controller.

Connecting the plurality of edge devices to the controller may include detecting an auto discovery request from the plurality of edge devices via SaaS-based secure-onboarding. Connecting the plurality of edge devices to the controller may include pre-provisioning the plurality of edge devices with an IP address of the controller or a domain name server (DNS) name of the controller. Connecting the client device to the controller may include pre-provisioning the client device with an IP address of the controller or a domain name server (DNS) name of the controller and authenticating the client device using an identity provider. Directly connecting the client device to one of the plurality of edge devices may include receiving a query from the client device for Internet key exchange (IKE) protocol enabled edge devices, secure sockets layer (SSL) protocol enabled edge devices, or combinations thereof; and returning public IP/ports of a most relevant edge device to the client device, the most relevant edge device being based on attributes of the client device, attributes of the plurality of edge devices, or combinations thereof.

The attributes of the client device may include a geo-location of the client device, an identity policy of the client device, and combinations thereof. The attributes of the plurality of edge devices may include a geo-location of the plurality of edge devices, load of plurality of edge devices, policies of the plurality of edge devices, and combinations thereof. The method may further include periodically refreshing a list of edge devices to generate a refreshed list and sending the refreshed list to the client device.

Examples described herein also provide a computing device including a processor, and a non-transitory computer-readable media storing instructions that, when executed by the processor, causes the processor to perform operations including connecting a plurality of edge devices to a controller via a network. The plurality of edge devices may perform hole punching to traverse a network address translation (NAT) gateway to create a NAT hole. The operations may further include connecting a client device to the controller and directly connecting the client device to one of the plurality of edge devices via the NAT hole in the network.

The hole punching may include registering the plurality of edges devices by transmitting at least one data packet from one of the plurality of edge devices to the controller via the NAT gateway. Registering the plurality of edge devices may include registering at least one post-NAT public internet protocol (IP) port with the controller.

Connecting the plurality of edge devices to the controller may include detecting an auto discovery request from the plurality of edge device via SaaS-based secure-onboarding. Connecting the plurality of edge devices to the controller may include pre-provisioning the plurality of edge devices with an IP address of the controller or a domain name server (DNS) name of the controller. Connecting the client device to the controller may include pre-provisioning the client device with an IP address of the controller or a domain name server (DNS) name of the controller and authenticating the client device using an identity provider.

Directly connecting the client device to one of the plurality of edge devices may include receiving a query from the client device for Internet key exchange (IKE) protocol enabled edge devices, secure sockets layer (SSL) protocol enabled edge devices, or combinations thereof, and returning public IP/ports of a most relevant edge device to the client device, the most relevant edge device being based on attributes of the client device, attributes of the plurality of edge devices, or combinations thereof. The attributes of the client device may include a geo-location of the client device, an identity policy of the client device, and combinations thereof. The attributes of the plurality of edge devices may include a geo-location of the plurality of edge devices, load of plurality of edge devices, policies of the plurality of edge devices, and combinations thereof. The operations may further include periodically refreshing a list of edge devices to generate a refreshed list and sending the refreshed list to the client device. The controller may be a software-defined wide area network (SD-WAN) controller.

Examples described herein also provide a non-transitory computer-readable medium storing instructions that, when executed, causes a processor to perform operations, including connecting a plurality of edge devices to a controller via a network. The plurality of edge devices may perform hole punching to traverse a network address translation (NAT) gateway to create a NAT hole. The operations may further include connecting a client device to the controller, and directly connecting the client device to one of the plurality of edge devices via the NAT hole in the network.

The operation of the hole punching may include registering the plurality of edges devices by transmitting at least one data packet from one of the plurality of edge devices to the controller via the NAT gateway. Further, a NAT translation entry is created as the edge devices 106 traverse the NAT gateway 102 to create a NAT hole as indicated by connections 108-1, 108-N as described in more detail below. The operations may further include periodically refreshing a list of edge devices to generate a refreshed list and sending the refreshed list to the client device.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Turning now to the figures, FIG. 1 illustrates a system-architecture diagram of a wide area network (WAN) 100, according to an example of the principles described herein. In one example, the elements of the WAN 100 may be defined by the MEF 70 SD-WAN service standard set by the Metro Ethernet Forum (MEF).

The WAN 100 may include a network address translation (NAT) gateway 102. The NAT gateway 102 may include any hardware, software, or combinations thereof that provides for the flow of data from one discrete network or device to another discrete network or device. In one example, the NAT gateway 102 may be deployed in an end-customer or enterprise network. In one example, the NAT gateway 102 may be deployed in a WAN. In one example, the NAT gateway 102 may be distinct from a router or switch in that the NAT gateway 102 communicates using more than one protocol to connect multiple networks and may operate at any of the seven layers of the open systems interconnection (OSI) model. Further, the NAT gateway 102 may include any hardware, software, or combinations thereof that provides the functions of NAT. NAT is a method of mapping an IP address space into another address space by modifying network address information in an internet protocol (IP) header of data packets while the data packets are in transit across the NAT gateway 102. Thus, the NAT gateway 102 may include any hardware, software, or combinations thereof that performs any kind of network address translation including altering an IP address or port of a source or destination. The NAT gateway 102 may provide access to an SD-WAN service in order to shorten the distance to cloud-based services or a user (e.g., a client device 110), and reduce service interruptions. A distributed network of gateways may be included in WAN 100 and its services by a vendor or setup and maintained by the organization or enterprise using the services. By sitting outside the headquarters in the cloud, the NAT gateway 102 may also reduce traffic at the headquarters.

The WAN 100 may further include a number of edge devices 106-1, . . . 106-N, where N is any integer greater than or equal to 1 (collectively referred to herein as edge device(s) 106 unless specifically addressed otherwise). The edge devices 106 may include any device that provides an entry point into enterprise or service provider core networks. In one example, the edge devices 106 may include a routers, a switch, a routing switches, an integrated access device (IAD), a multiplexer, any metropolitan area network (MAN) or wide area network (WAN) access device, and combinations thereof. In one example, the edge device 106 may include RA headend devices. In this example, the RA headend devices may include a control device utilized by a network (e.g., a LAN or a MAN). The headend devices may provide functions such as re-modulation, re-timing, message accountability, contention control, diagnostic control, traffic steering, segment routing, load balancing enforcement of QoS and security policies, and access to a gateway such as the NAT gateway 102. The edge devices 106 may include dynamic, private WAN IP in which the edge devices 106 learn about routing information without the help from an administrator and adds a best route to its routing table. An edge device 106 running a dynamic routing protocol may add the best route to its routing table and may also determine another path if a primary route goes down.

Figure 4:
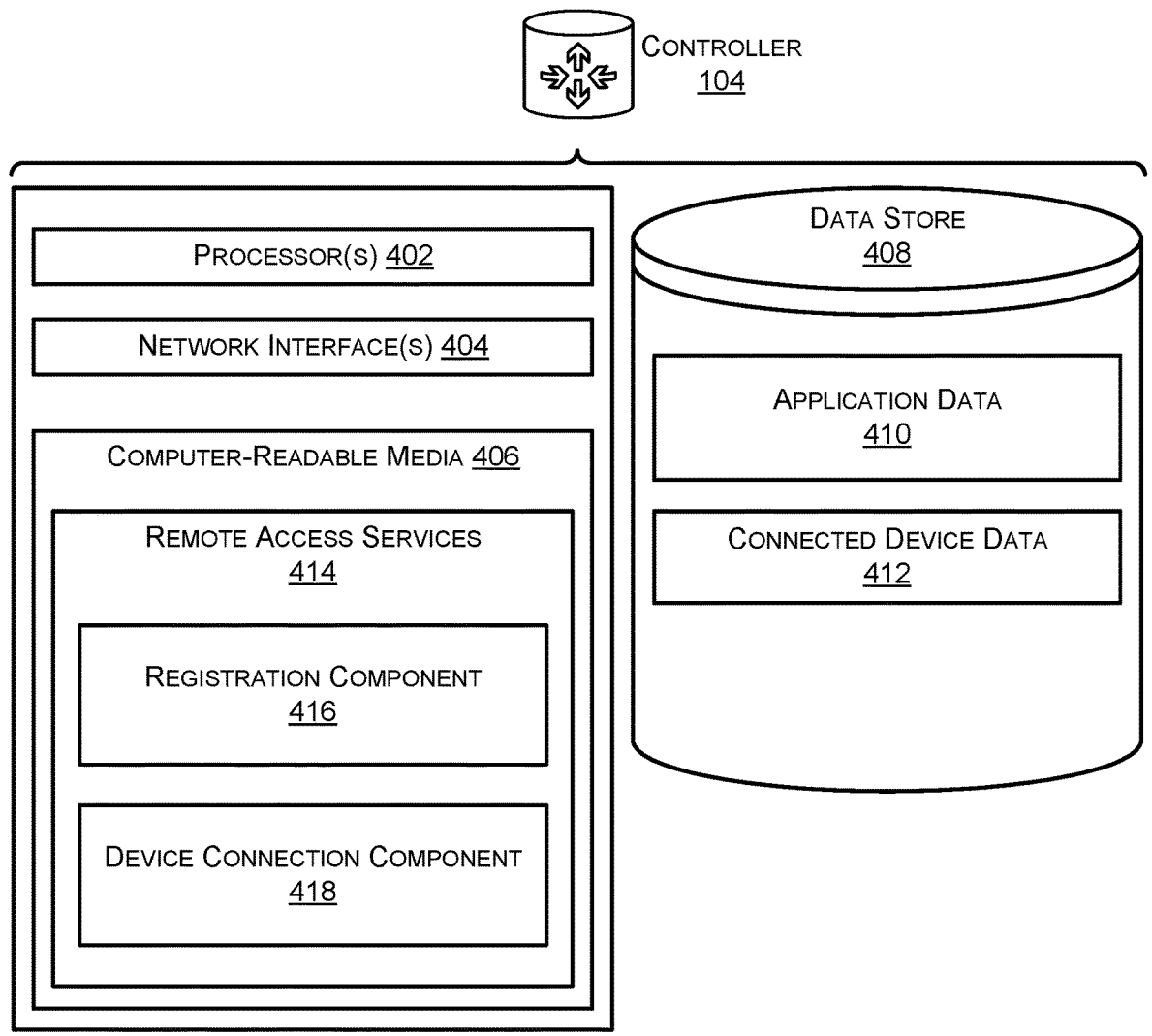
FIG. 4 is a component diagram of example components of a controller including remote access services, according to an example of the principles described herein.

The WAN 100 may further include a controller 104 to assist in implementing the controller-based distributed remote access described herein. Although a single controller 104 is depicted in FIG. 4, any number of controllers may be included in the WAN 100. In one example, the controller 104 may include and any hardware, software, or combinations thereof that decouples the networking hardware from its control mechanism. In one example, the controller 104 may include a software-defined (SD) WAN services (e.g., hardware such as servers and/or management software) that may allow an organization or enterprise to build a higher-performance WAN using lower-cost and commercially available Internet access, thus enabling the organization or enterprise to partially or wholly replace more expensive private WAN connection technologies such as multi-protocol label switching (MPLS). Thus, in one example, the WAN 100 may include an SD-WAN architecture including a number of SD-WAN edge devices (e.g., edge devices 106), an SD-WAN gateway (e.g., the NAT gateway 102), and an SD-WAN controller (e.g., the controller 104).

In one example, the WAN 100 may also include an SD-WAN orchestrator (not shown). The SD-WAN orchestrator may include any cloud hosted or on-premises web management device that allows configuration, provisioning and other functions when operating an SD-WAN (e.g., the WAN 100). The SD-WAN orchestrator may simplify application traffic management by allowing central implementation of a number of business policies of an organization or enterprise.

The functionality of the controller 104 may be separate from an SD-WAN orchestrator being different devices owned by separate entities or individuals. In one example, the functionality of the controller 104 may be placed in the SD-WAN orchestrator and, may include making forwarding decisions for application flows including IP packets that have been classified to determine their user application or grouping of applications to which they are associated. The grouping of application flows based on a common type, determines, via OSI Layer 2 through Layer 7 classification, which application flow the IP packets belong to, and then applies the policies to block the application flow or allow the application flows to be forwarded based on the availability of a route to a destination SD-WAN user network interface (UNI) on a remote edge device 106. This ensures that application performance meets service level agreements (SLAs).

The client device 110 may be any device that seeks to access the resources provided by the organization or enterprise. The client device 110 may include, for example, a user computing device associated with the organization or enterprise. In one example, the client device may include a workstation, a desktop computer, a laptop, a tablet, a network appliance, an e-reader, a smartphone, or other computing device.

With the above description of the NAT gateway 102, the controller 104, the edge devices 106, and the client device 110, the process by which the client device 110 remotely access the services provided by the edge devices 106 via the controller 104 will now be described. Implementing the controller-based distributed remote access may include connecting a plurality of edge devices 106 to the controller 104 via a network including the network address translation (NAT) gateway 102. The plurality of edge devices 106 perform hole punching to traverse the NAT gateway 102 to create a NAT hole as indicated by connections 108-1, 108-N. Hole punching may include any technique utilized in computer networking for establishing a direct connection between two parties in which one or both are behind firewalls or behind routers that use network address translation (NAT). Here, the two parties seeking to directly connect include the client device 110 and the edge devices 106. To punch a hole, each edge device 106 may connect to an unrestricted third-party server that temporarily stores external and internal address and port information for each edge device 106 and the client device 110. A NAT translation entry is created as the edge devices 106 traverse the NAT gateway 102 to create a NAT hole as indicated by connections 108-1, 108-N as described in more detail below. The controller 104 serves as the third-party server.

The controller 104 may then relay the edge device 106 information to the client device 110 via connection 114, and, using that information, the client device 110 may attempt to establish a direct connection 112 with one of the edge devices 106. As a result of the connections 108-1, 108-N using valid port numbers, the otherwise restrictive nature of the NAT gateway 102 may accept and forward the incoming packets from both the client device 110 and the edge device 106 to which the client device 110 connects.

In one example, the hole punching process described herein may not require any knowledge of the network topology to function including the network topology of the NAT gateway 102 and/or the WAN 100 as a whole. Various protocols may be used during the hole punching process and as the NAT gateway 102, the controller 104, the edge devices 106 and the client device 110 communicate with one another. For example, Internet control message protocol (ICMP) hole punching, user datagram protocol (UDP) hole punching, and transmission control protocol (TCP) hole punching may be used in which each uses, respectively, ICMP, UDP, and TCP.

In order for the edge device(s) 106 to punch the hole through the NAT gateway 102, the edge devices 106 may auto-discover the controller 104 or may be pre-provisioned with the IP and/or domain name server (DNS) name of the controller 104. Auto-discovery may include the process of finding the controller 104 that is participating in the same network such as the WAN 100. In one example, the edge devices 106 may use a vendor software-as-a-service (SaaS)-based secure onboarding service. Further, in instances where the edge devices 106 are pre-provisioned with the IP and/or DNS name of the controller 104, the edge devices 106 may connect to the controller 104 through the NAT gateway 102 using the pre-provisioned IP and/or DNS name of the controller 104.

The edge devices 106, once communication with the controller 104 for NAT traversal (e.g., hole punching), may register a number of post-NAT public IP address(es) and/or port(s) with the controller 104. The controller 104 may store data defining the registration of the public IP address(es) and/or port(s) for the edge devices 106.

The client device 110 may also connect to the controller 104. In one example, the client device 110 may be pre-provisioned with the IP address and/or a DNS name of the controller 104 to allow for the client device 110 to connect with the controller 104 by navigating to the IP address and/or the DNS name of the controller 104. In one example, the client device 110 may connect to the controller 104 over a secure channel. The controller 104 may then authenticate the client 110 using an identity provider of the organization or enterprise. In one example, the identity provider may include Identity Services Engine developed and distributed by Cisco Systems, Inc., Active Directory developed and distributed by Microsoft Co., or Remote Authentication Dial-In User Service (RADIUS) networking protocol.

In order to allow the client device 110 to discover and connect with one of the edge devices 106, the client device 110 may query the controller 104 for edge devices 106 that are internet key exchange (IKE) protocol and/or secure sockets layer (SSL) protocol enabled. In response to this query, the controller 104 may return public IP address(es) and/or port(s) of the edge devices 106. In one example, the controller 104 may return the public IP address(es) and/or port(s) of a most relevant edge device 106 to the client device 110. In one example, the most relevant edge device 106 may be determined RA headend for the client, based on, for example, attributes of the client device 110, attributes of the plurality of edge devices 106, or combinations thereof. In one example, the attributes of the client device 110 may include a geo-location of the client device 110 with respect to the edge devices 106, an identity policy of the client device 110, and combinations thereof. The attributes of the edge devices 106 may include a geo-location of the plurality of edge devices 106 with respect to the client device 110, a load of plurality of edge devices 106, policies of the plurality of edge devices 106, and combinations thereof. Thus, based on the above, the most relevant edge device 106 may, in one example, include the edge device 106 that is closest in physical proximity to the client device 110 and aligns with an identity policy of the client device 110. With regard to the load of the plurality of edge devices 106 (e.g., an amount of computational work that the edge devices 106 are engaged in), in one example, the first edge device 106-1 may have a relatively lighter load relative to the second edge device 106-N which may more likely cause the first edge device 106-1 to be coupled to the client device 110 as opposed to the second edge device 106-N. Further, the second edge device 106-N may have identity policies that may preclude the second edge device 106-N from coupling to the client device 110. Any of a combination of the characteristics of the client device 110 and the edge devices 106 may determine which edge device 106 the client device 110 may couple to.

In one example, the connection between the client device 110 and the edge device 106 to which the client device 110 is coupled may be implemented over a number of non-standard ports that may be used for traversal (e.g., hole punching) of the NAT gateway 102. In one example, the post-NAT ports provided by the controller 104 may include non-standard IKEv2/SSL ports. The client device 110 may connect to the post-NAT public IP address of the non-standard post-NAT ports. In this manner, the client device 110 may directly connect to one of the plurality of edge devices 106 via the NAT hole within the NAT gateway 102 of the WAN 100.

In one example, a list of edge devices 106 communicatively coupled to the controller and having formed a NAT hole traversing the NAT gateway 102 may be refreshed in order to obtain a new list of available edge devices 106 within the WAN 100. In one example, the refreshing of the list of available edge devices 106 may include periodically (e.g., every minute, every hour, every day, etc.) discovering edge devices 106 and determining if some edge devices 106 are no longer available and/or if any new edge devices 106 have been detected. In one example, the refreshing of the list of available edge devices 106 may include discovering edge devices 106 and determining if some edge devices 106 are no longer available and/or if any new edge devices 106 have been detected on an as-needed basis. For example, if the client device 110 cannot connect to a provided edge device 106, then the controller 104 may refresh the list of available edge devices 106. In one example, once a refreshing of the list of edge devices 106 takes place, the controller 104 may send the list of available edge devices 106 to the client device 110 to allow the client device 110 to couple to an edge device 106 as described herein.

Figure 2:
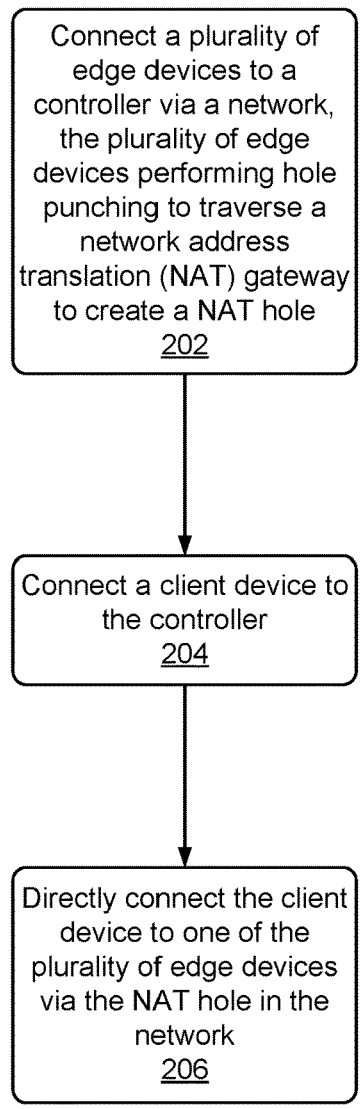
FIG. 2 illustrates a flow diagram of an example method for implementing controller-based distributed remote access, according to an example of the principles described herein.

FIG. 2 illustrates a flow diagram of an example method 200 for implementing controller-based distributed remote access, according to an example of the principles described herein. The method 200 of FIG. 2 may include, at 202, connecting a plurality of edge devices 106 to the controller 104 via the WAN 100 and traversing the NAT gateway 102. As described herein, the plurality of edge devices 106 may perform hole punching to traverse the NAT gateway 102 and create a NAT hole. As described herein, the connecting of the plurality of edge devices 106 to the controller 104 may include receiving traffic from the plurality of edge devices at the NAT gateway 102 and registering the plurality of edge devices 106 as to the controller 104. Registering the plurality of edge devices 106 may include registering at least one post-NAT public internet protocol (IP) port with the controller 104. Further, connecting the plurality of edge devices 106 to the controller 104 may include detecting an auto discovery request from the plurality of edge devices 106 via SaaS-based secure-onboarding. Further, connecting the plurality of edge devices 106 to the controller 104 may include pre-provisioning the plurality of edge devices 106 with an IP address of the controller 104 or a DNS name of the controller 104.

At 204, a client device 110 may connect to the controller 104. As described herein, the connection of the client device 110 may include pre-provisioning the client device 110 with an IP address of the controller 104 or a domain name server (DNS) name of the controller 104 and authenticating the client device 110 using an identity provider.

The method 200 may further include, at 206, directly connecting the client device 110 to one of the plurality of edge devices 106 via the NAT hole in the NAT gateway 102 of the WAN 100. Directly connecting the client device to one of the plurality of edge devices may include receiving a query from the client device 110 for IKE protocol enabled edge devices 106. SSL protocol enabled edge devices 106, and combinations thereof. Further, public IP/ports of a most relevant edge device headend may be returned to the client device 110. In one example, the most relevant edge device 106 may be based on attributes of the client device 110, attributes of the plurality of edge devices 106, and combinations thereof. The attributes of the client device 110 may include a geo-location of the client device 110, an identity policy of the client device 110, and combinations thereof. The attributes of the plurality of edge devices 106 may include a geo-location of the plurality of edge devices 106, load of the plurality of edge devices 106, policies of the plurality of edge devices 106, and combinations thereof.

Figure 3:
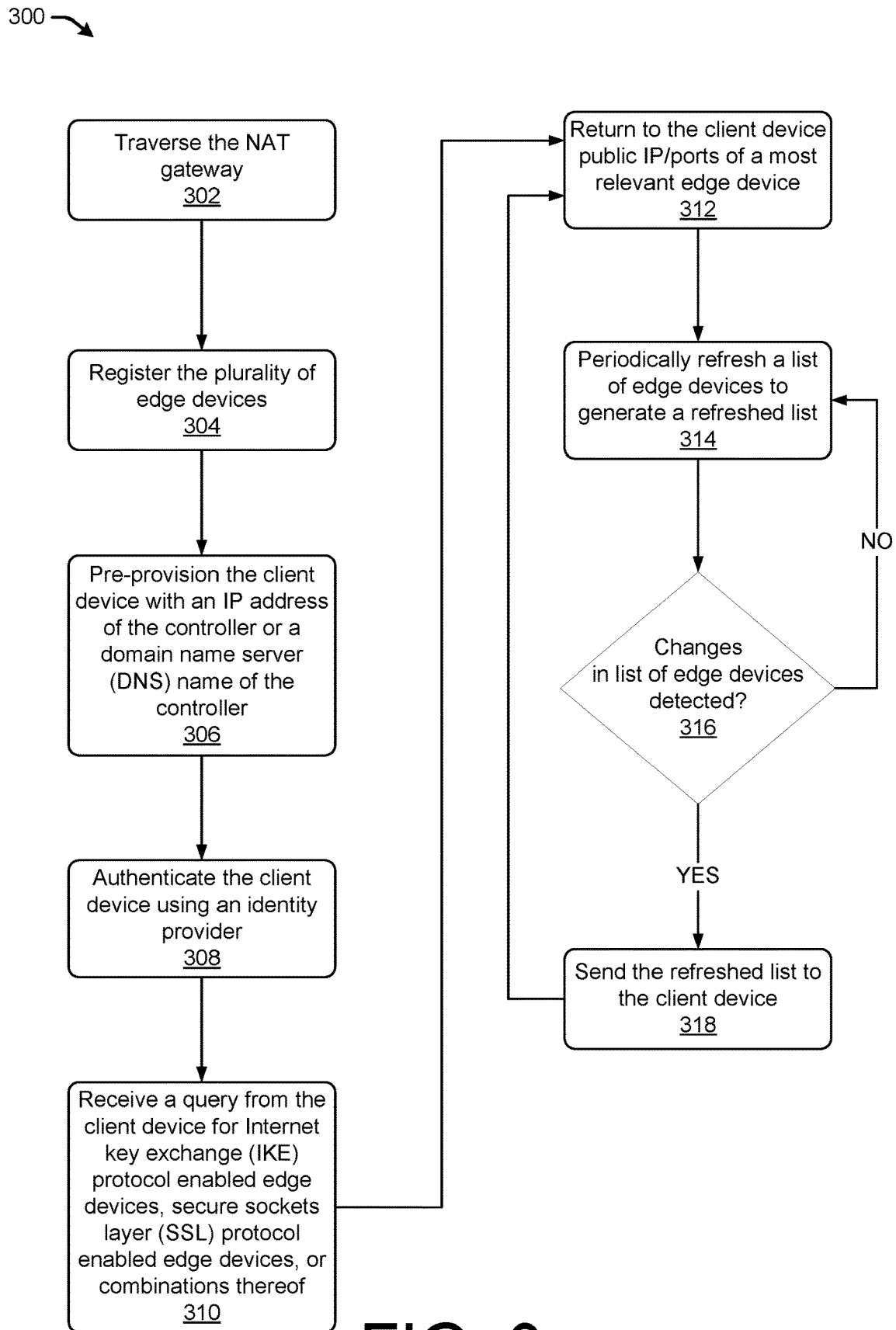
FIG. 3 illustrates a flow diagram of an example method for implementing controller-based distributed remote access, according to an example of the principles described herein.

FIG. 3 illustrates a flow diagram of an example method 300 for implementing controller-based distributed remote access, according to an example of the principles described herein. The method 300 of FIG. 3 may include details regarding the method 200 of FIG. 2. At 302 of FIG. 3, the method 300 may include connecting of the plurality of edge devices 106 to the controller 104 traversing the NAT gateway 102. In other words, the plurality of edges devices 106 may be registered with the controller 104 by transmitting at least one data packet from one or more of the plurality of edge devices 106 to the controller 104 via the NAT gateway. The transmission of the at least one data packet from one or more of the plurality of edge devices 106 to the controller 104 punches a hole through the NAT gateway 102 to allow for the at least one data packet to traverse the NAT gateway 102 and create for at least a predefined period of time a NAT hole within the NAT gateway 102 and underlying network. In one example, the controller 104 may temporarily store external and internal address and port information for each edge device 106 and/or client device 110. The controller 104 may then relay information associated with the edge devices 106 and/or client devices 110 to each other and the controller 104. Using that information, each of the edge devices 106 and/or client devices 110 may attempt to establish a direct connection, and as a result of the connections using valid port numbers, restrictive firewalls, or routers to accept and forward the incoming packets on each side. In one example, the hole punching may not require any knowledge of the network topology to function. Internet control message protocol (ICMP) hole punching, user datagram protocol (UDP) hole punching and transmission control protocol (TCP) hole punching may be used in which each uses, respectively, ICMP, UDP, and TCP. In one example, once an ICMP time exceeded packet reaches the destination NAT gateway 102, arbitrary data in the packet expected by the NAT allows the packet to reach the destination server (e.g., the controller 104), allowing the controller 104 to obtain the IP addresses and other data stored in the packet from the edge devices 106 and/or client devices 110. In one example, the hole punched through the NAT gateway 102 may remain open for as long as data packets are transmitted via the punched hole, for a predefined period of time, based on other parameters, and combinations thereof.

At 304, the plurality of edge devices 106 may be registered as to the controller 104 as described above. Registering the plurality of edge devices 106 may further include registering at least one post-NAT public internet protocol (IP) port with the controller 104. Further, connecting the plurality of edge devices 106 to the controller 104 may include detecting an auto discovery request from the plurality of edge devices 106 via SaaS-based secure-onboarding. Further, connecting the plurality of edge devices 106 to the controller 104 may include pre-provisioning the plurality of edge devices 106 with an IP address of the controller 104 or a DNS name of the controller 104.

At 306, a client device 110 may connect to the controller 104 by pre-provisioning the client device 110 with an IP address of the controller 104 or a domain name server (DNS) name of the controller 104. At 308, the controller 104 may authenticate the client device 110 using an identity provider.

At 310, the method 300 may further include directly connecting the client device 110 to one of the plurality of edge devices 106 via the NAT hole in the NAT gateway 102 of the WAN 100 by receiving a query from the client device 110 for IKE protocol enabled edge devices 106, SSL protocol enabled edge devices 106, and combinations thereof. At 312, public IP/ports of a most relevant edge device edge device may be returned to the client device 110. In one example, the most relevant edge device 106 may be based on attributes of the client device 110, attributes of the plurality of edge devices 106, and combinations thereof. The attributes of the client device 110 may include a geo-location of the client device 110, an identity policy of the client device 110, and combinations thereof. The attributes of the plurality of edge devices 106 may include a geo-location of the plurality of edge devices 106, load of the plurality of edge devices 106, policies of the plurality of edge devices 106, and combinations thereof.

Because the number of available edge devices 106 within the WAN 100 may change, at 314, the method 300 may further include periodically refreshing a list of the edge devices 106 to generate a refreshed list of edge devices 106. Periodically refreshing the list at 314 may include refreshing at any period of time (e.g., every minute, every hour, every day, etc.) between which discovering edge devices 106 is performed. In one example, the controller 104 may make perform the refreshing of the list of edge devices 106 at 314. At 316, the controller 104, for example, may make a determination as to whether a change in the list of edge devices 106 has occurred based on the refreshing of the list of edge devices 106.

If no change is detected (316, determination NO), then the process may loop back to 314 to allow for the process of periodically refreshing the list of edge devices 106. If the controller 104 determines that a change in the list of edge devices 106 has occurred (316, determination YES), then the method 300 may proceed to 318 where the refreshed list of edge devices 106 may be sent to the client device 110 so that the client device 318 may utilize the refreshed list of edge devices to, at 312, determine the most relevant edge device 106 to which the client device 110 should connect at the method 300 loops back to 312.

FIG. 4 is a component diagram of example components of a controller 104 including remote access services 414, according to an example of the principles described herein. As illustrated, the controller 104 may include one or more hardware processor(s) 402 configured to execute one or more stored instructions. The processor(s) 402 may comprise one or more cores. Further, the controller 104 may include one or more network interfaces 404 configured to provide communications between the controller 104 and other devices, such as devices associated with the WAN 100 of FIG. 1 including the NAT gateway 102, the edge devices 106, the client device 110, and/or other systems or devices associated with the controller 104 and/or remote from the controller 104. The network interfaces 404 may include devices configured to couple to personal area networks (PANs), wired and wireless local area networks (LANs), wired and wireless wide area networks (WANs), and so forth. For example, the network interfaces 404 may include devices compatible with the NAT gateway 102, the controller 104, the edge devices 106, the client device 110 and/or other systems or devices associated with the controller 104.

The controller 104 may also include computer-readable media 406 that stores various executable components (e.g., software-based components, firmware-based components, etc.). In one example, the computer-readable media 406 may include, for example, working memory, random access memory (RAM), read only memory (ROM), and other forms of persistent, non-persistent, volatile, non-volatile, and other types of data storage. In addition to various components discussed herein, the computer-readable media 406 may further store components to implement functionality described herein. While not illustrated, the computer-readable media 406 may store one or more operating systems utilized to control the operation of the one or more devices that comprise the controller 104. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the controller 104 may include a data store 408 which may comprise one, or multiple, repositories or other storage locations for persistently storing and managing collections of data such as databases, simple files, binary, and/or any other data. The data store 408 may include one or more storage locations that may be managed by one or more database management systems. The data store 408 may store, for example, application data 410 defining computer-executable code utilized by the processor 402 to execute the remote access services 414. Further, the application data 410 may include data relating to user preferences associated with the remote access services 414 used to provide remote access to the client device to the edge devices 106. Further, the data store 408 may store a connected device data including data defining IP addresses, ports, DNS names, data associated with an identity provider, and other data defining how a client device 110 and the edge devices 106 couple to and maintain a connection with the controller 104. The connected device data 412 may include any data described herein that may assist in the provisioning of the remote access as described herein.

The computer-readable media 406 may store portions, or components, of remote access services 414. For instance, the remote access services 414 of the computer-readable media 406 may include a registration component 416 to, when executed by the processor(s) 402, register the edge devices 106 after the edge devices 106 perform a hole punching through the NAT gateway 102 to allow the edge devices 106 to traverse the NAT gateway 102 and connect with the controller 104. The computer-readable media 406 may also include a device connection component 418 to, when executed by the processor(s) 402, connect the edge devices 106 and the client device 110 to the controller as described herein. As described herein, the hole punching operation may be performed by the NAT gateway 102 creating a NAT translation entry as the edge devices 106 perform traverse the NAT gateway 102 to create a NAT hole as indicated by connections 108-1, 108-N.

Figure 5:
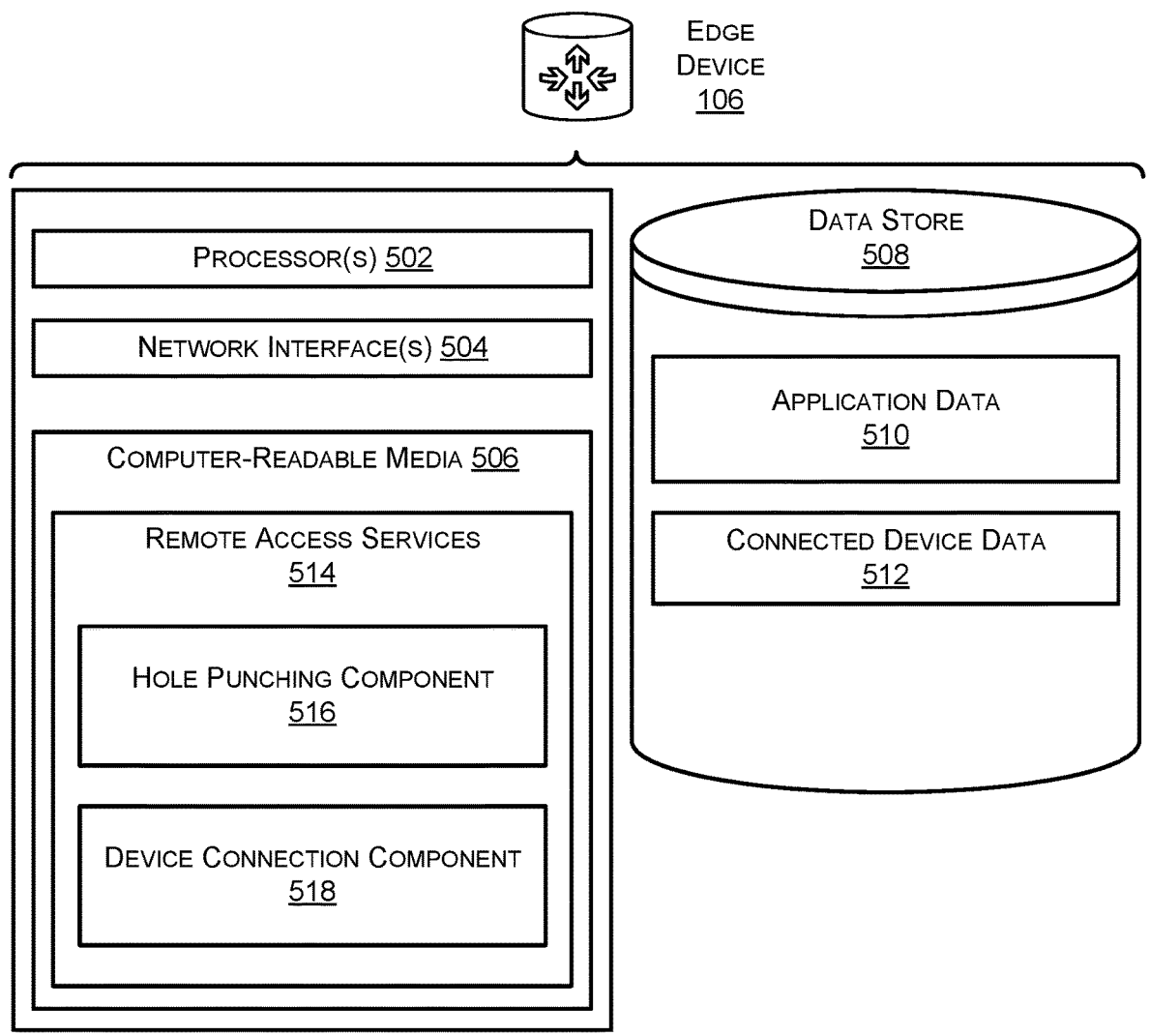
FIG. 5 is a component diagram of example components of an edge device including remote access services, according to an example of the principles described herein.

FIG. 5 is a component diagram of example components of an edge device 106 including remote access services 514, according to an example of the principles described herein. As illustrated, the edge device 106 may include one or more hardware processor(s) 502 configured to execute one or more stored instructions. The processor(s) 502 may comprise one or more cores. Further, the edge device 106 may include one or more network interfaces 504 configured to provide communications between the edge device 106 and other devices, such as devices associated with the WAN 100 of FIG. 1 including the NAT gateway 102, other edge devices 106, the client device 110, and/or other systems or devices associated with the edge device 106 and/or remote from the edge device 106. The network interfaces 504 may include devices configured to couple to personal area networks (PANs), wired and wireless local area networks (LANs), wired and wireless wide area networks (WANs), and so forth. For example, the network interfaces 504 may include devices compatible with the NAT gateway 102, the edge devices 106, the controller 104, the client device 110 and/or other systems or devices associated with the edge device 106.

The edge device 106 may also include computer-readable media 506 that stores various executable components (e.g., software-based components, firmware-based components, etc.). In one example, the computer-readable media 506 may include, for example, working memory, random access memory (RAM), read only memory (ROM), and other forms of persistent, non-persistent, volatile, non-volatile, and other types of data storage. In addition to various components discussed herein, the computer-readable media 506 may further store components to implement functionality described herein. While not illustrated, the computer-readable media 506 may store one or more operating systems utilized to control the operation of the one or more devices that comprise the edge device 106. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the edge device 106 may include a data store 508 which may comprise one, or multiple, repositories or other storage locations for persistently storing and managing collections of data such as databases, simple files, binary, and/or any other data. The data store 508 may include one or more storage locations that may be managed by one or more database management systems. The data store 508 may store, for example, application data 510 defining computer-executable code utilized by the processor 502 to execute the remote access services 514. Further, the application data 510 may include data relating to user preferences associated with the remote access services 514 used to provide remote access to the client device to the edge devices 106. Further, the data store 508 may store a connected device data including data defining IP addresses, ports, DNS names, data associated with an identity provider, and other data defining how a client device 110, the edge devices 106, and the controller 104 couple to and maintain a connection with one another. The connected device data 512 may include any data described herein that may assist in the provisioning of the remote access as described herein.

The computer-readable media 506 may store portions, or components, of remote access services 514. For instance, the remote access services 514 of the computer-readable media 506 may include a hole punching component 516 to, when executed by the processor(s) 502, perform a hole punching through the NAT gateway 102 to allow the client devices 110 to traverse the NAT gateway 102 and connect with the edge device 106. The computer-readable media 506 may also include a device connection component 518 to, when executed by the processor(s) 502, connect the edge devices 106 to the controller as described herein.

Figure 6:
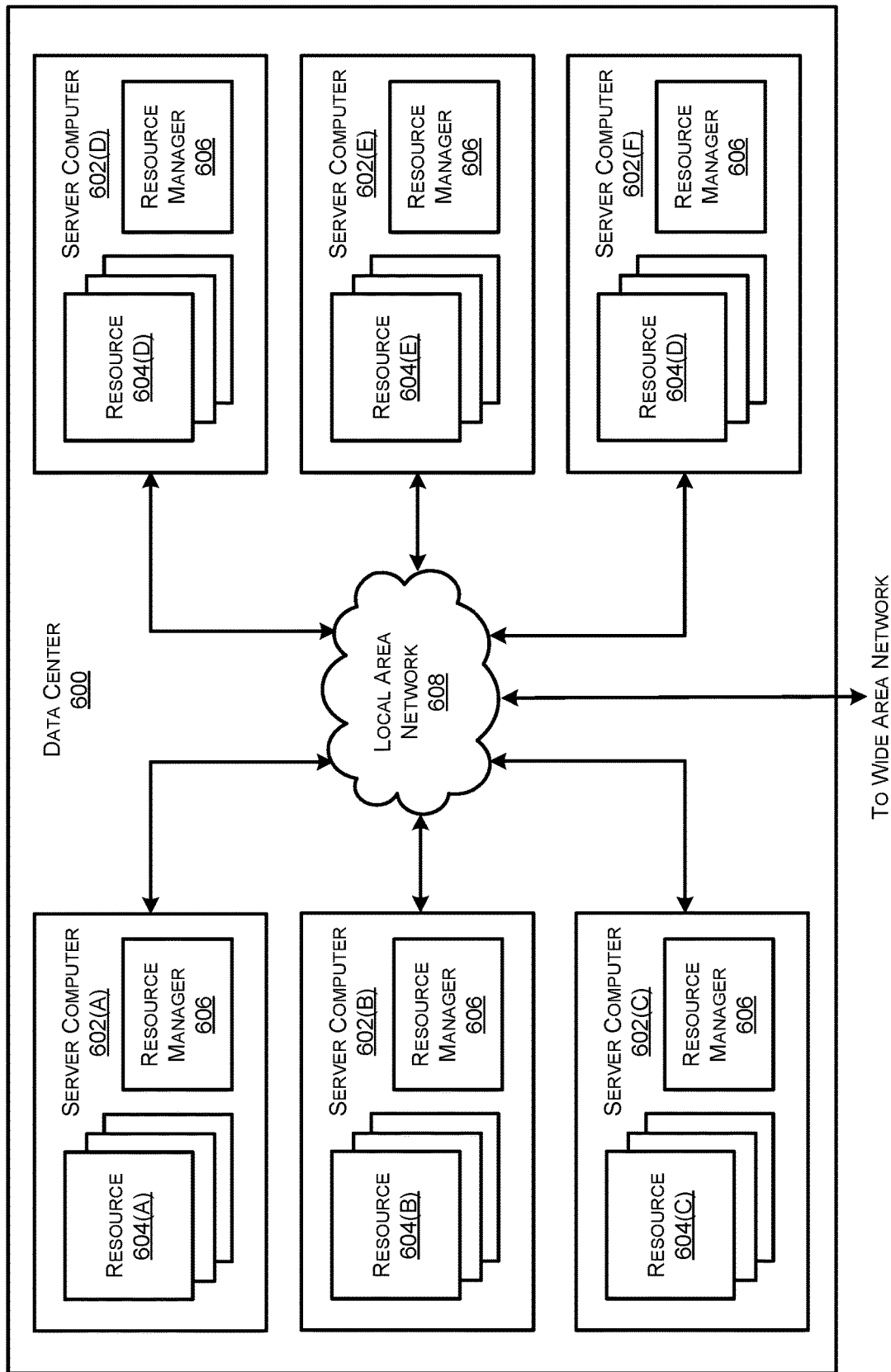
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may comprise any type of networked device, such as servers, switches, routers, hubs, bridges, gateways, modems, repeaters, access points, etc.

The server computers 602 may be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 5.

Figure 7:
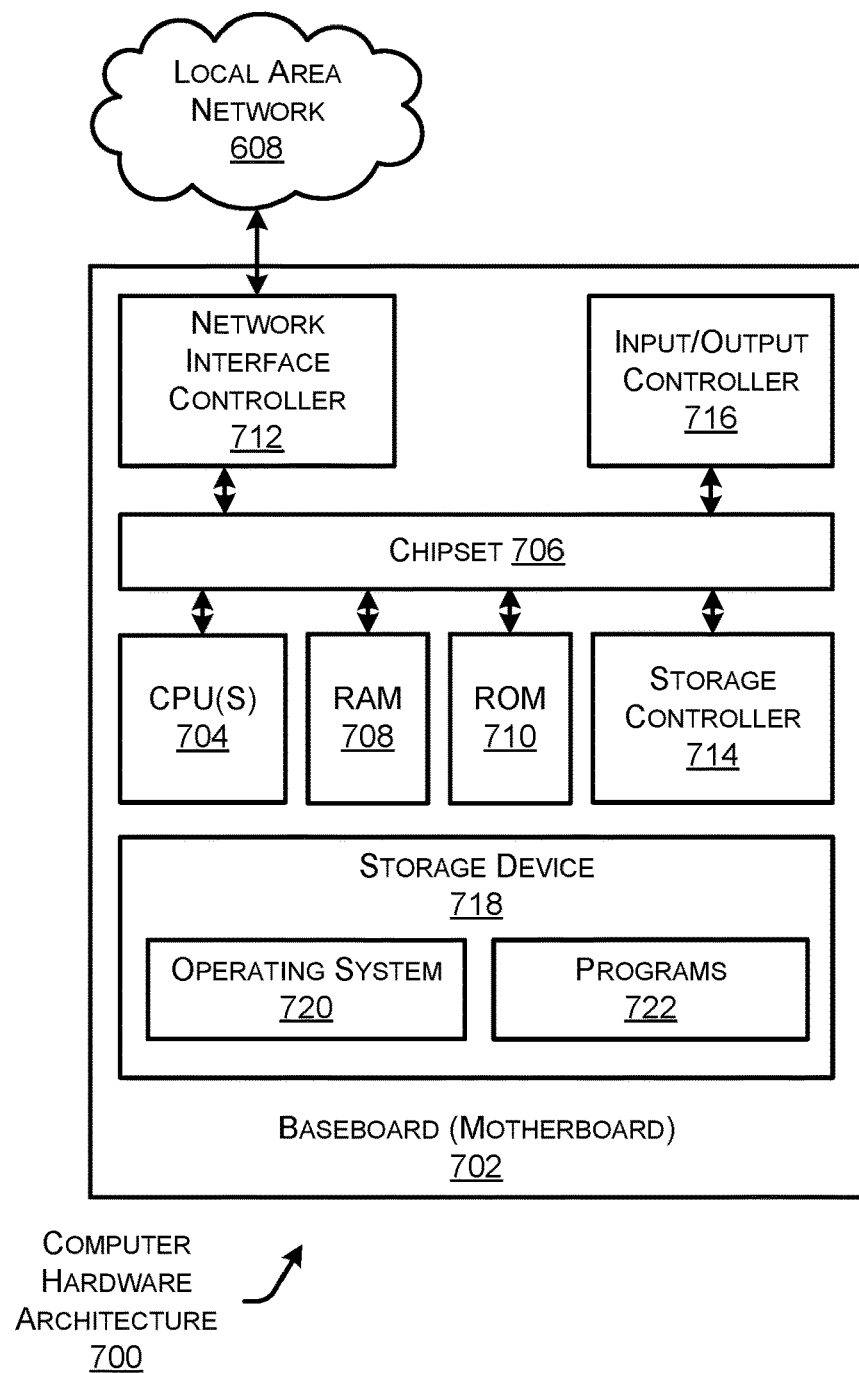
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the NAT gateway 102, the controller 104, the edge devices 106, the client device 110, and/or other systems or devices associated with the WAN 100 and/or remote from the WAN 100, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., the NAT gateway 102, the controller 104, the edge devices 106, the client device 110 (and associated devices) described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the NAT gateway 102, the controller 104, the edge devices 106, the client device 110, among other devices. The chipset 706 may include functionality for providing network connectivity through a Network Interface Controller (NIC) 712, such as a gigabit Ethernet adapter. The NIC 712 is capable of connecting the computer 700 to other computing devices within the WAN 100 and external to the WAN 100. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the NAT gateway 102, the controller 104, the edge devices 106, the client device 110, and or any components included therein, may be supported by one or more devices similar to computer 700. Stated otherwise, some or all of the operations performed by the NAT gateway 102, the controller 104, the edge devices 106, the client device 110, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may comprise one or more of the NAT gateway 102, the controller 104, the edge devices 106, the client device 110, and/or other systems or devices associated with the controller 104 and/or remote from the controller 104. The computer 700 may include one or more hardware processor(s) such as the CPUs 704 configured to execute one or more stored instructions. The CPUs 704 may comprise one or more cores. Further, the computer 700 may include one or more network interfaces configured to provide communications between the computer 700 and other devices, such as the communications described herein as being performed by the NAT gateway 102, the controller 104, the edge devices 106, the client device 110, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may comprise any type of programs or processes to perform the techniques described in this disclosure for the NAT gateway 102, the controller 104, the edge devices 106, the client device 110 as described herein. The programs 722 may enable the devices described herein to perform various operations.

CONCLUSION

The examples described herein provide systems, methods, and non-transitory computer-readable medium storing instructions that, when executed, causes a processor to perform operations associated with the controller-based distributed remote access services described herein. With the above-described systems and methods, RA headend static IP avoidance though the utilization of the edge devices 106 reduces WAN costs and offers operational simplicity. Further, the edge devices 106 (e.g., RA headend edge devices) with non-static IP addresses reduces DDOS exposure and saves costs of DDOS mitigation services. Still further, distributed remote access enables large scale remote access deployment for use cases like hybrid work situations where users work remotely from on-premises properties of the organization or enterprise. Auto-discovery of the edge devices 106 leads to operational simplicity and optimal connectivity. Further, the controller-driven RA discovery assists in the distribution of RA client devices across the edge devices 106 based on geolocation, identity and load based policies, among other characteristics described herein.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of implementing controller-based distributed remote access, comprising:
    connecting a plurality of edge devices to a controller via a network, the plurality of edge devices performing hole punching to traverse a network address translation (NAT) gateway to create a NAT hole and detecting an auto discovery request from the plurality of edge devices via SaaS-based secure-onboarding;
    connecting a client device to the controller comprising:
        pre-provisioning the client device with identification information of the controller; and
        authenticating the client device using an identity provider;
    receiving, at the controller and from the client device, a request to connect to an edge device of the plurality of edge devices;
    determining, by the controller and based on the request, at least one of a first attribute of the client device or a second attribute of the edge device; and
    based at least in part on the at least one of the first attribute or the second attribute, directly connecting the client device to the edge device via the NAT hole in the network.

2. The method of claim 1, wherein the hole punching comprises registering the plurality of edge devices by transmitting at least one data packet from the edge device to the controller via the NAT gateway.

3. The method of claim 2, wherein registering the plurality of edge devices comprises registering at least one post-NAT public internet protocol (IP) port with the controller.

4. The method of claim 1, wherein:
    the first attribute comprises a geo-location of the client device, an identity policy of the client device, and combinations thereof, and
    the second attribute comprises a geo-location of the plurality of edge devices, load of plurality of edge devices, policies of the plurality of edge devices, and combinations thereof.

5. The method of claim 4, wherein the second attribute indicates that the edge device is closest in physical proximity to the client device as defined by the geo-location of the client device and the geo-location of the edge device.

6. The method of claim 4, wherein the second attribute indicates that the edge device has a lightest load as defined by the load of the plurality of edge devices.

7. The method of claim 4, wherein the second attribute indicates that the edge device of the plurality of edge devices that does not include a first policy precluding coupling to the client device.

8. The method of claim 1, wherein connecting a client device to the controller further comprises registering the client device comprising registering at least one post-NAT public internet protocol (IP) port with the controller.

9. The method of claim 1, wherein the NAT hole remains open as long as data packets are transmitted via the NAT hole, for a predefined period of time, and combinations thereof.

10. The method of claim 1, wherein edge device is a first edge device, and directly connecting the client device to the first edge device is at a first instance, the method further comprising:
    determining a third attribute of a second edge device of the plurality of edge devices;
    updating, based at least in part on the third attribute and at a second instance, a list of available edge devices to generate an updated list, the updated list including an indication of the second edge device; and
    based at least in part on the updated list, directly connecting the client device to the second edge device at a second instance instead of the first edge device.

11. The method of claim 10, further comprising:
determining, by the controller, a failure associated with connecting the client device to the first edge device, wherein determining, by the controller, the third attribute is further based at least in part on the failure.

12. A computing device comprising:
a processor; and
a non-transitory computer-readable media storing instructions that, when executed by the processor, causes the processor to perform operations comprising:
connecting a plurality of edge devices to a controller via a network, the plurality of edge devices performing hole punching to traverse a network address translation (NAT) gateway to create a NAT hole and detecting an auto discovery request from the plurality of edge devices via SaaS-based secure-onboarding;
connecting a client device to the controller comprising:
pre-provisioning the client device with identification information of the controller; and
authenticating the client device using an identity provider;
receiving, at the controller and from the client device, a request to connect to an edge device of the plurality of edge devices;
determining, by the controller and based on the request, at least one of a first attribute of the client device or a second attribute of the edge device; and
based at least in part on the at least one of the first attribute or the second attribute, directly connecting the client device to the edge device via the NAT hole in the network.

13. The computing device of claim 12, wherein the hole punching comprises:
registering the plurality of edge devices by transmitting at least one data packet from the edge device to the controller via the NAT gateway,
wherein registering the plurality of edge devices comprises registering at least one post-NAT public internet protocol (IP) port with the controller.

14. The computing device of claim 12, wherein:
the first attribute comprises a geo-location of the client device, an identity policy of the client device, and combinations thereof, and
the second attribute comprises a geo-location of the plurality of edge devices, load of plurality of edge devices, policies of the plurality of edge devices, and combinations thereof.

15. The computing device of claim 12, further comprising:
periodically updating a list of edge devices to generate an updated list; and
sending the updated list to the client device.

16. The computing device of claim 12, wherein the controller is a software-defined wide area network (SD-WAN) controller.

17. A non-transitory computer-readable medium storing instructions that, when executed, causes a processor to perform operations, comprising:
connecting a plurality of edge devices to a controller via a network, the plurality of edge devices performing hole punching to traverse a network address translation (NAT) gateway to create a NAT hole and detecting an auto discovery request from the plurality of edge devices via SaaS-based secure-onboarding;
connecting a client device to the controller comprising:
pre-provisioning the client device with identification information of the controller; and
authenticating the client device using an identity provider;
receiving, at the controller and from the client device, a request to connect to an edge device of the plurality of edge devices;
determining, by the controller and based on the request, at least one of a first attribute of the client device or a second attribute of the edge device; and
based at least in part on the at least one of the first attribute or the second attribute, directly connecting the client device to the edge device via the NAT hole in the network.

18. The non-transitory computer-readable medium of claim 17, wherein the performing the hole punching comprises registering the plurality of edge devices by transmitting at least one data packet from the edge device to the controller via the NAT gateway.

19. The non-transitory computer-readable medium of claim 18, wherein registering the plurality of edge devices comprises registering at least one post-NAT public internet protocol (IP) port with the controller.

20. The non-transitory computer-readable medium of claim 17, the operations further comprising:
periodically updating a list of edge devices to generate an updated list; and
sending the updated list to the client device.

* * * * *